(12) United States Patent
Tan (10) Patent No.: US 10,191,659 B2
(45) Date of Patent: Jan. 29, 2019

(54) BUFFER MEMORY MANAGEMENT METHOD, MEMORY CONTROL CIRCUIT UNIT AND MEMORY STORAGE DEVICE

(71) Applicant: PHISON ELECTRONICS CORP., Miaoli (TW)

(72) Inventor: Kok-Yong Tan, Miaoli County (TW)

(73) Assignee: PHISON ELECTRONICS CORP., Miaoli (TW)

( * ) Notice: Subject to any disclaimer, the term of this patent is extended or adjusted under 35 U.S.C. 154(b) by 93 days.

(21) Appl. No.: 14/997,576

(22) Filed: Jan. 18, 2016

(65) Prior Publication Data

US 2017/0139593 A1   May 18, 2017

(30) Foreign Application Priority Data

Nov. 17, 2015   (TW) .............................. 104137825 A (51) Int. Cl.
 *G06F 3/06* (2006.01)
(52) U.S. Cl.
 CPC ............ *G06F 3/061* (2013.01); *G06F 3/0619* (2013.01); *G06F 3/0659* (2013.01); *G06F 3/0679* (2013.01)
(58) Field of Classification Search
 CPC ...... G06F 3/061; G06F 3/0659; G06F 3/0679; G06F 3/0246
 See application file for complete search history.

(56) References Cited

U.S. PATENT DOCUMENTS

| 7,924,857 | B2 * | 4/2011 | Kataria | ................... H04L 49/90 370/249 |
| 8,327,076 | B2 | 12/2012 | Murphy et al. | |
| 8,458,394 | B2 | 6/2013 | Lee | |
| 2010/0082888 | A1 * | 4/2010 | Mitsunaga | .......... G06F 12/0246 711/103 |
| 2010/0095054 | A1 * | 4/2010 | Terasaki | .............. G06F 12/0246 711/103 |
| 2010/0293337 | A1 * | 11/2010 | Murphy | .............. G06F 12/0866 711/136 |
| 2011/0239043 | A1 * | 9/2011 | Vedder | .................... G06F 1/263 714/14 |
| 2014/0149607 | A1 * | 5/2014 | Shim | ..................... G06F 3/0659 710/5 |
| 2015/0039803 | A1 * | 2/2015 | Yamamoto | .............. G06F 13/28 710/308 |

(Continued)

FOREIGN PATENT DOCUMENTS

CN            101014929            5/2010

OTHER PUBLICATIONS

"Office Action of Taiwan Counterpart Application," dated Apr. 28, 2017, p. 1-p. 7.

(Continued)

*Primary Examiner* — Nanci N Wong
(74) *Attorney, Agent, or Firm* — JCIPRNET (57) ABSTRACT

A data access method for a memory storage device is provided. The memory storage device includes a rewritable non-volatile memory module and a buffer memory. The method includes: receiving at least one operation command including at least one read command; and counting an amount of accumulative data of the at least one read command, and if the amount of accumulative data reaches a data threshold, writing the data in the buffer memory into the rewritable non-volatile memory module.

18 Claims, 8 Drawing Sheets

(56) References Cited

U.S. PATENT DOCUMENTS

2015/0248256 A1* 9/2015 Clevengen .............. G06F 9/546
 710/74
2016/0210044 A1* 7/2016 Mitkar ................... G06F 3/061

OTHER PUBLICATIONS

"Office Action of Taiwan Counterpart Application", dated Jul. 13, 2017, p. 1-p. 7.

* cited by examiner

BUFFER MEMORY MANAGEMENT METHOD, MEMORY CONTROL CIRCUIT UNIT AND MEMORY STORAGE DEVICE

CROSS-REFERENCE TO RELATED APPLICATION

This application claims the priority benefit of Taiwan application serial no. 104137825, filed on Nov. 17, 2015. The entirety of the above-mentioned patent application is hereby incorporated by reference herein and made a part of this specification.

BACKGROUND

Technical Field

The present invention generally relates to a data access method and a memory control circuit unit and a memory storage device using the data access method.

Description of Related Art

The markets of digital cameras, cellular phones, and MP3 players have expanded rapidly in recent years, resulting in escalated demand for storage media by consumers. The characteristics of data non-volatility, low power consumption, compact size, non-mechanical structure, and fast read/write speed make a rewritable non-volatile memory ideal to be built into portable electronic devices such as notebook computers. Solid-state drive (SSD) is a type of memory storage device using flash as storage media. As a result, flash memory has recently become an important part of the electronic industries.

A memory storage device using the rewritable non-volatile memory as a storage medium is usually disposed with a buffer memory, which is configured to temporarily store program codes or data, or serve as a temporary storage area for data used when background tasks are executed by the memory storage device, and the temporarily stored program codes are stored in buffer units of the buffer memory. For instance, when executing a write operation upon receiving a write command, the controller of the memory storage device writes the data corresponding to the write command into the buffer units and updates a logical unit-buffer unit mapping table, so as to record logical units corresponding to each buffer unit. When receiving a read commend and executing a read operation, the controller of the memory storage device searches for the buffer units storing the data corresponding to the read command according to the logical unit-buffer unit mapping table, and reads the data of the buffer units found.

However, when the buffer memory is already stored with a large amount of data, it takes the controller of the memory storage device a lot of time to search the logical unit-buffer unit mapping table. As a result, the read time by the host system is too long, read speed drops, and the overall function of the memory storage device drops. Accordingly, how to improve efficiency of data reading to increase the overall function of memory storage devices is one of the major subjects for person skilled in the art.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

The present invention is directed to a data access method, a memory controller, and a memory storage device, capable of decreasing the time of read operation of the host system and increasing the efficiency of data reading of memory control circuit unit (or memory management circuit).

In an exemplary embodiment of the invention, the data access method for a memory storage device includes a rewritable non-volatile memory module and a buffer memory. The data access method includes: receiving at least one operation command; the at least one operation command includes at least one read command; counting an amount of accumulative data of the at least one read command, and writing the data in the buffer memory into the rewritable non-volatile memory module if the amount of accumulative data reaches a data threshold.

In an exemplary embodiment of the invention, a memory control circuit unit is configured to control the rewritable non-volatile memory module. The memory control circuit unit includes a host interface, a memory interface, a buffer memory and a memory management circuit. The host interface is coupled to a host system. The memory interface is coupled to the rewritable nonvolatile memory module. The buffer memory is coupled to the host interface and the memory interface. The memory management circuit is coupled to the host interface, the memory interface and the buffer memory. The memory management circuit unit is configured to receive at least one operation command. The at least one operation command includes at least one read command. The memory management circuit counts the amount of accumulative data of the at least one read command and writes the data in the buffer memory into the rewritable non-volatile memory module if the amount of accumulative data reaches a data threshold.

An exemplary embodiment of the invention provides a memory storage device which includes a connection interface unit, a rewritable non-volatile memory module and aforesaid memory control circuit unit. The connecting interface unit is coupled to a host system. The memory control circuit unit is coupled to the connecting interface unit and the rewritable non-volatile memory module, and includes a buffer storage unit. The memory control circuit unit is configured to receive at least one operation command, and at least one operation command includes at least one read command. The memory control circuit unit counts the amount of accumulative data of the at least one read command and writes the data in the buffer memory into the rewritable non-volatile memory module if the amount of accumulative data reaches a data threshold.

According to the above exemplary embodiment, data in buffer memory is cleared and written into the rewritable non-volatile memory module via counting the amount of accumulative data of consecutively received read commands. This way, while the buffer memory is not stored with valid data, the operation of searching the logical unit-buffer unit mapping table can be omitted, and if the buffer memory is stored with valid data, the problem of decreased read speed of the memory control circuit unit due to enlarged logical unit-buffer unit mapping table can be prevented. Accordingly, the above described embodiment can effectively raise the overall function of the memory storage device.

The following embodiments and figures illustrate the above-described features.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to present the preferred embodiments of the invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

Generally, a memory storage device (also known as a memory storage system) includes a rewritable non-volatile memory module and a controller (also known as a control circuit). The memory storage device is usually used together with a host system so that the host system may write data into the memory storage device or read data from the memory storage device.

Figure 1:
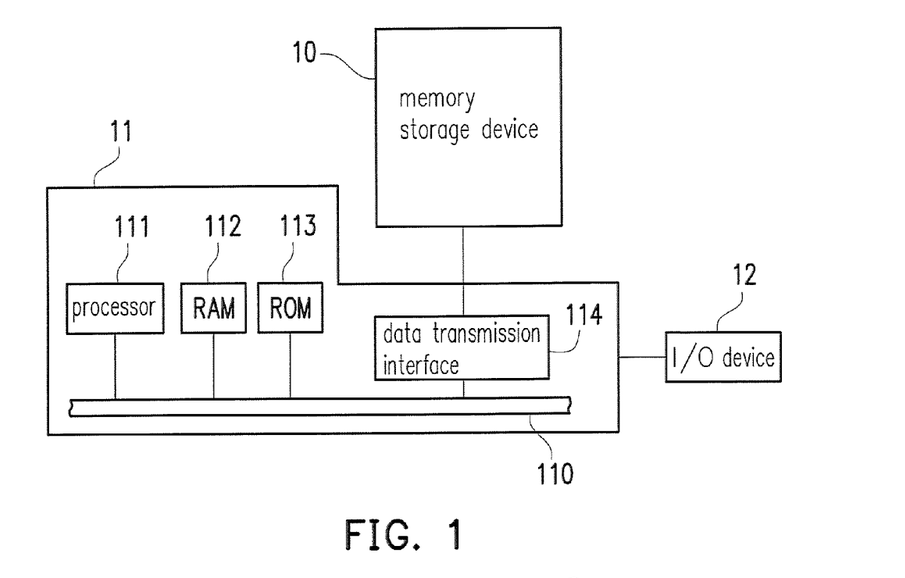
FIG. 1 is a schematic diagram illustrating a host system, a memory storage device, and an input/output (I/O) device according to an exemplary embodiment of the invention.
Figure 2:
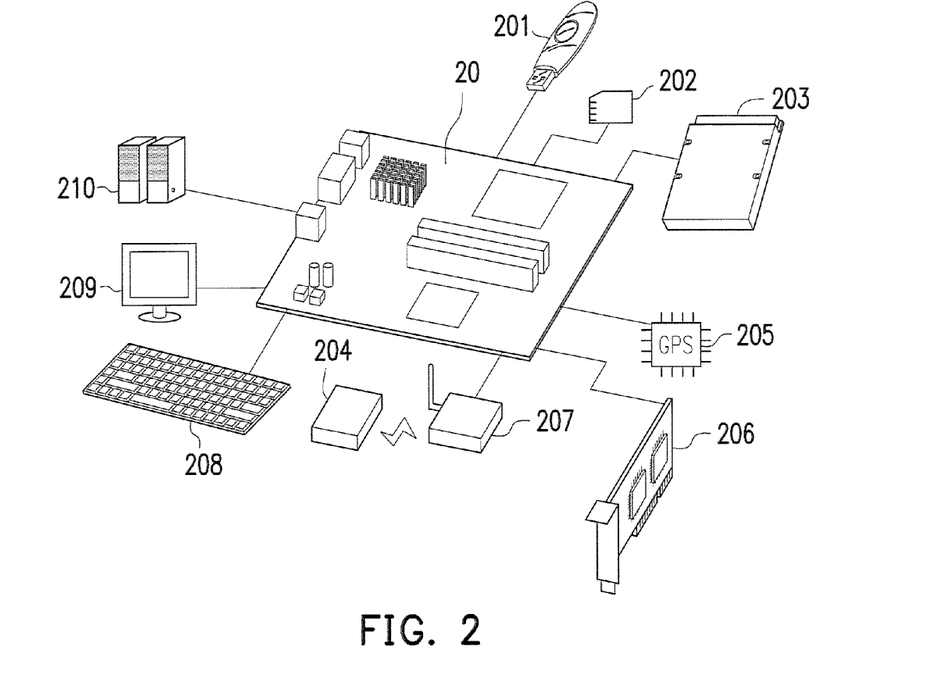
FIG. 2 is a schematic diagram illustrating a host system, a memory storage device, and an I/O device according to another exemplary embodiment of the invention.

FIG. 1 is a schematic diagram illustrating a host system, a memory storage device, and an input/output (I/O) device according to an exemplary embodiment of the invention. FIG. 2 is a schematic diagram illustrating a host system, a memory storage device, and an I/O device according to another exemplary embodiment of the invention.

Referring to FIG. 1 and FIG. 2, the host system 11 includes a processor 111, a random access memory (RAM) 112, a read only memory (ROM) 113, and a data transmission interface 114. The processor 111, the RAM 112, the ROM 113, and the data transmission interface 114 are coupled to a system bus 110.

In the exemplary embodiment, the host system 11 is coupled to a memory storage device 10 through the data transmission interface 114. For instance, by using the data transmission interface 114, data may be written into the memory storage device 10 or may be read from the memory storage device 10 by the host system 11. Moreover, the host system 11 is coupled to the I/O device 12 through the system bus 110. For instance, the host system 11 outputs signal to the I/O device 12 or receives input signal from the I/O device 12 through the system bus 110.

In the exemplary embodiment, the processor 111, the RAM 112, the ROM 113, and the data transmission interface 114 may be disposed on a motherboard 20 of the host system 11. The number of data transmission interface 114 may be one or more. Through the data transmission interface 114, the motherboard 20 is coupled to the memory storage device 10 through wire or wirelessly. The memory storage device 10 may be a flash drive 201, a memory card 202, a solid state drive (SSD) 203, or a wireless memory storage device 204. The wireless memory storage device 204 may be, for instance, a Near Field Communication (NFC) memory storage device, a WiFi memory storage device, a Bluetooth memory storage device, or a low power consumption memory storage device (e.g. iBeacon) and other type of memory storage device based on wireless communication technologies. Moreover, the mother board 20 can be coupled to different types of I/O devices such as a global positioning system (GPS) 205, a network interface card 206, a wireless transmission device 207, a keyboard 208, a monitor 209, and speakers 210 through the system bus 110. For instance, in an exemplary embodiment, the host system 20 accesses the memory storage device 204 through the wireless transmission device 207.

Figure 3:
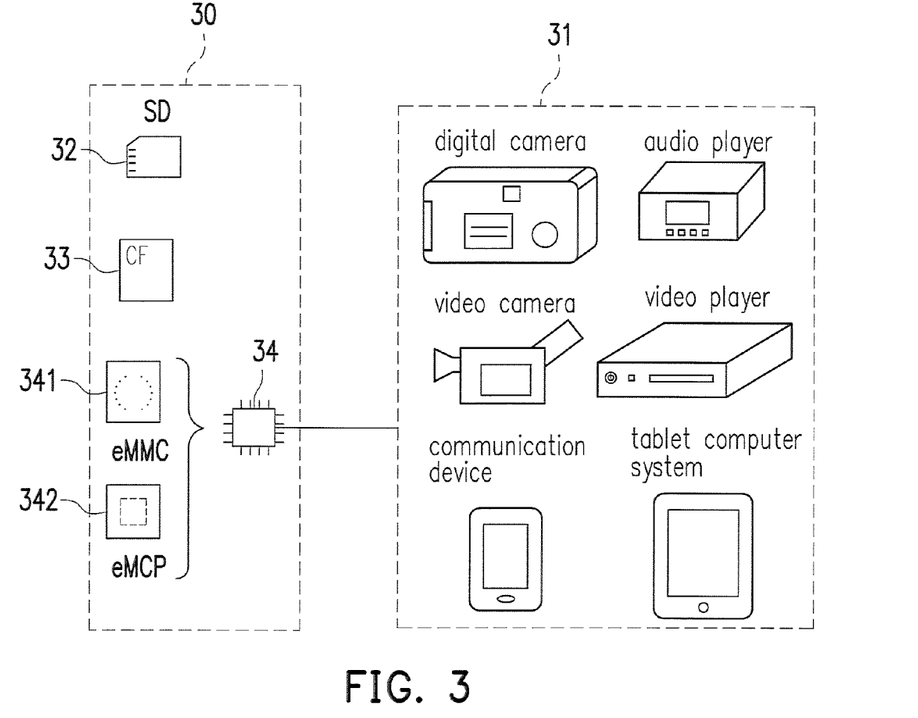
FIG. 3 is a schematic diagram illustrating a host system and a memory storage device according to another exemplary embodiment of the invention.

In an exemplary embodiment, the host system may be any system substantially capable of storing data with the memory storage device. Although in the above exemplary embodiments, the host system is illustrated with a computer system, FIG. 3 is a schematic diagram illustrating a host system and a memory storage device according to another exemplary embodiment of the invention. Referring to FIG. 3, in another exemplary embodiment, the host system 31 may be a digital camera, video camera, a communication device, an audio player, a video player, or a tablet computer system, and the memory storage device 30 may be a SD card 32, a CF card 33, or an embedded storage device 34 or other nonvolatile memory storage device. The embedded storage device 34 includes an embedded MMC (eMMC) 341 and/or an embedded Multi Chip Package (eMCP) 342 or other embedded storage device directly coupling a memory module to a substrate of the host system.

Figure 4:
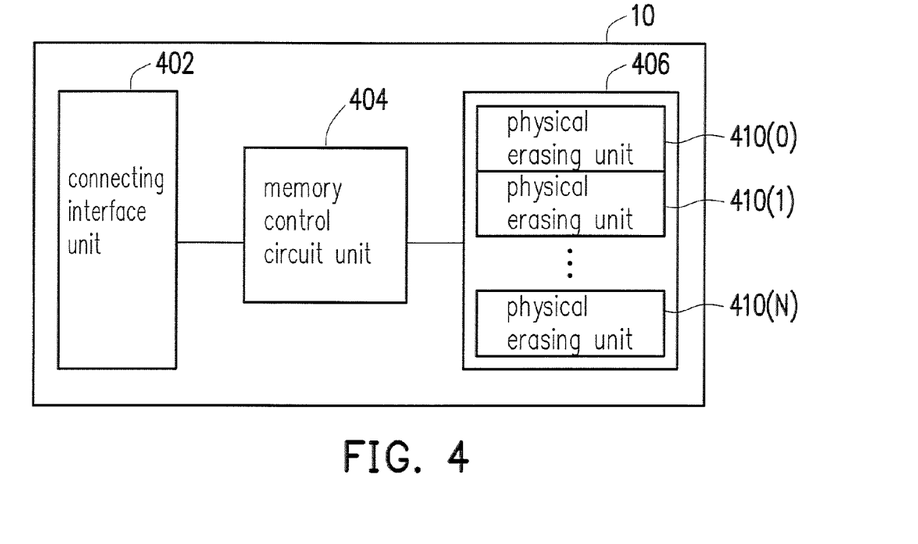
FIG. 4 is a schematic block diagram illustrating a memory storage device according to an exemplary embodiment.

FIG. 4 is a schematic block diagram illustrating a memory storage device according to an exemplary embodiment.

Referring to FIG. 4, the memory storage device 10 includes a connecting interface unit 402, a memory control circuit unit 404 and a rewritable non-volatile memory module 406.

In the exemplary embodiment, the connecting interface unit 402 is compatible with a serial advanced technology attachment (SATA) standard. Nevertheless, it should be understood that the invention is not limited thereto. The connecting interface unit 402 may also be compatible with Parallel Advanced Technology Attachment (PATA) standard, Institute of Electrical and Electronic Engineers (IEEE) 1394 standard, Peripheral Component Interconnect (PCI) Express interface standard, Universal Serial Bus (USB) standard, Secure Digital (SD) interface standard, Ultra High Speed-I (UHS-I) interface standard, Ultra High Speed-II (UHS-II) interface standard, Memory Stick (MS) interface standard, Multi-Chip Package interface standard, Multi Media Card (MMC) interface standard, Embedded Multimedia Card (eMMC) interface standard, Universal Flash Storage (UFS) interface standard, embedded Multi Chip Package (eMCP) interface standard, Compact Flash (CF) interface standard, Integrated Device Electronics (IDE) interface standard or other suitable standards. The connecting interface unit 402 and the memory control circuit unit 404 may be packaged into one chip, or the connecting interface unit 402 may be emplaced outside of a chip containing the memory control circuit unit 404.

The memory control circuit unit 404 is configured to execute logic gates or control commands which are implemented in form of hardware or firmware, so as to execute operations of writing, reading and erasing data in the rewritable non-volatile memory storage module 406 according to commands from the host system 11.

The rewritable non-volatile memory module 406 is coupled to the memory control circuit unit 404 and configured to store data written from the host system 11. The rewritable non-volatile memory storage module 406 includes multiple physical erasing units 410(0) to 410(N). For example, the physical erasing units 410(0) to 410(N) may belong to the same memory die or belong to different memory dies. Each physical erasing unit has multiple physical programming units, and the physical programming units of the same physical erasing unit may be written separately and erased simultaneously. Nevertheless, it should be understood that the invention is not limited thereto. Each physical erasing unit is composed by 64 physical programming units, 256 physical programming units or any amount of the physical programming units.

More specifically, the physical erasing unit is the minimum unit for erasing. Namely, each physical erasing unit contains the least number of memory cells to be erased together. The physical programming unit is the minimum unit for programming. That is, the programming unit is the minimum unit for writing data. Each physical programming unit usually includes a data bit area and a redundancy bit area. The data bit area having multiple physical access addresses is used to store user data, and the redundant bit area is used to store system data (e.g., control information and error checking and correcting code). In the present exemplary embodiment, each data bit area of the physical programming unit contains 8 physical access addresses, and the size of each physical access address is 512 byte. However, in other exemplary embodiments, the data bit area may also include more or less physical access addresses, and the size and the number of the physical access addresses are not limited in the invention. For example, in an exemplary embodiment, the physical erasing unit is a physical block, and the physical programming unit is a physical page or a physical sector, but the invention is not limited thereto.

In the present exemplary embodiment, the rewritable non-volatile memory module 406 is a Multi Level Cell (MLC) NAND flash memory module (i.e., a flash memory module capable of storing two data bits in one memory cell). However, the disclosure is not limited thereto. The rewritable non-volatile memory module 406 may also be a Single Level Cell (SLC) NAND flash memory module, (i.e., a flash memory module capable of storing one data bit in one memory cell), a Trinary Level Cell (TLC) NAND flash memory module (i.e., a flash memory module capable of storing three data bits in one memory cell), other flash memory modules or any memory module having the same features.

Figure 5:
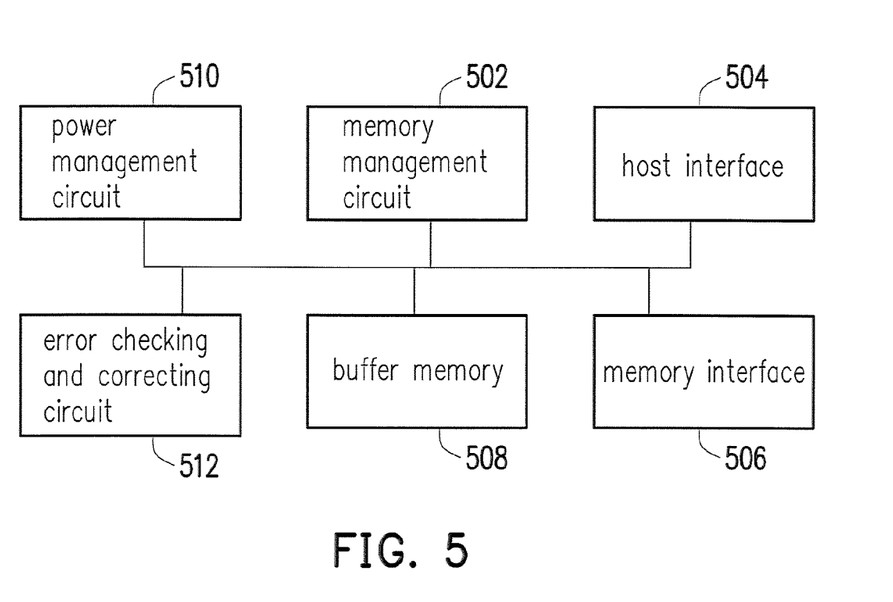
FIG. 5 is a schematic block diagram illustrating a memory control circuit unit according to an exemplary embodiment.

FIG. 5 is a schematic block diagram illustrating a memory control circuit unit according to an exemplary embodiment.

Referring to FIG. 5, the memory control circuit unit 404 includes a memory management circuit 502, a host interface 504, and a memory interface 506.

The memory management circuit 502 is configured to control overall operations of the memory control circuit unit 404. Specifically, the memory management circuit 502 has control commands. During operations of the memory storage device 10, the control commands are executed to carry out various operations such as writing, reading and erasing data.

In the present exemplary embodiment, the control commands of the memory management circuit 502 are implemented in form of firmware. For instance, the memory management circuit 502 has a microprocessor unit (not shown) and a read-only memory (not shown), and the control commands are burnt into the read-only memory. When the memory storage device 10 operates, the control commands are executed by the microprocessor to write, read or erase data.

According to another exemplary embodiment of the invention, the control commands of the memory management circuit 502 may also be stored into a specific area (e.g., a system area in the memory module exclusively used for storing the system data) of the rewritable non-volatile memory module 406 as program codes. In addition, the memory management circuit 502 has a microprocessor unit (not illustrated), a ROM (not illustrated) and a RAM (not illustrated). Particularly, the ROM has an activate code, which is executed by the microprocessor unit to load the control commands stored in the rewritable non-volatile memory module 406 to the RAM of the memory management circuit 502 when the memory control circuit unit 404 is enabled. Thereafter, the control commands are executed by the microprocessor unit to write, read or erase data.

The host interface 504 is coupled to the memory management circuit 502 and is configured to couple to the connecting interface unit 402, so as to receive and identify commands and data sent from the host system 11. In other words, the commands and data sent from the host system 11 are passed to the memory management circuit 502 through the host interface 504. In the present exemplary embodiment, the host interface 504 is compatible with the SATA standard. However, it should be understood that the invention is not limited thereto, and the host interface 504 may also be compatible with a PATA standard, an IEEE 1394 standard, a PCI Express standard, a USB standard, a UHS-I standard, a UHS-II standard, a SD standard, a MS standard, a MMC standard, a CF standard, an IDE standard, or other suitable standards for data transmission.

The memory interface 506 is coupled to the memory management circuit 502 and configured to access the rewritable non-volatile memory module 406. That is, data to be written to the rewritable non-volatile memory module 406 is converted to a format acceptable to the rewritable non-volatile memory module 406 through the memory interface 506.

In an exemplary embodiment, the memory control circuit unit 404 also includes a buffer memory 508, a power management circuit 510, and an error checking and correcting (ECC) circuit 512.

The buffer memory 508 is coupled to the memory management circuit 502 and configured to temporarily store data and commands from the host system 11 or data from the rewritable non-volatile memory module 406.

Figure 6:
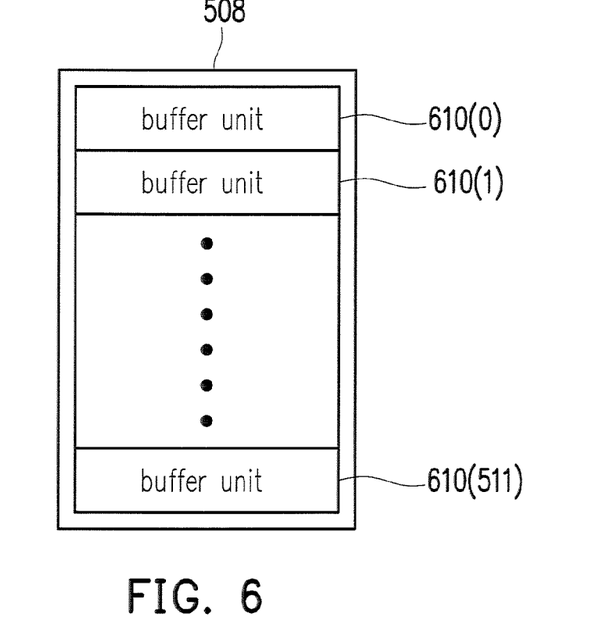
FIG. 6 is a schematic diagram illustrating a buffer memory according to an exemplary embodiment.

FIG. 6 is a schematic diagram illustrating a buffer memory according to an exemplary embodiment.

Referring to FIG. 6, in the present exemplary embodiment, the buffer memory 508 has 512 buffer units (i.e. buffer units 610(0)~610(511)), and the size of each buffer unit is 4 KB. In addition, in the present exemplary embodiment, the size of four buffer units corresponds to the size of one physical programming unit of the rewritable non-volatile memory module. However, it must be understood that the present exemplary embodiment does not limit the number or the size of buffer units configured to the buffer memory 508 or the size of data transmitted by the host system 11. For instance, in another exemplary embodiment, the number of buffer units in the buffer memory 508 may be greater or less than 512. Moreover, the host system 11, for instance, uses 4 KB as the unit for transmitting or accessing data, or the host system 11 may also use a data size greater or less than 4 KB for each transmission or access.

The buffer units 610(0)~610(511) are configured to temporarily store data and commands to be written into the rewritable non-volatile memory module 406 from the host system 11 or data from the rewritable non-volatile memory module 406. Moreover, the buffer units 610(0)~610(511) may also be configured to be a temporary storage area for data when background tasks are executed by the memory control circuit unit 404 (or the memory management circuit 502) of the memory storage device 10. For instance, the background tasks are tasks such as storing mapping tables, garbage collection and/or error correction.

Referring to FIG. 5, the power management unit 510 is coupled to the memory management circuit 502 and is configured to control a power of the memory storage device 10.

The error checking and correcting circuit 512 is coupled to the memory management circuit 502 and is configured to execute an error checking and correcting process to ensure the correctness of data. Specifically, when the memory management circuit 502 receives a write command from the host system 11, the error checking and correcting circuit 512 generates an error checking and correcting code (ECC code) for data corresponding to the write command, and the memory management circuit 502 writes data and the ECC code corresponding to the write command to the rewritable non-volatile memory module 406. Subsequently, when the memory management circuit 502 reads the data from the rewritable non-volatile memory module 406, the error checking and correcting code corresponding to the data is also read, and the error checking and correcting circuit 512 may execute the error checking and correcting procedure for the read data according to the error checking and correcting code.

Figure 7A:
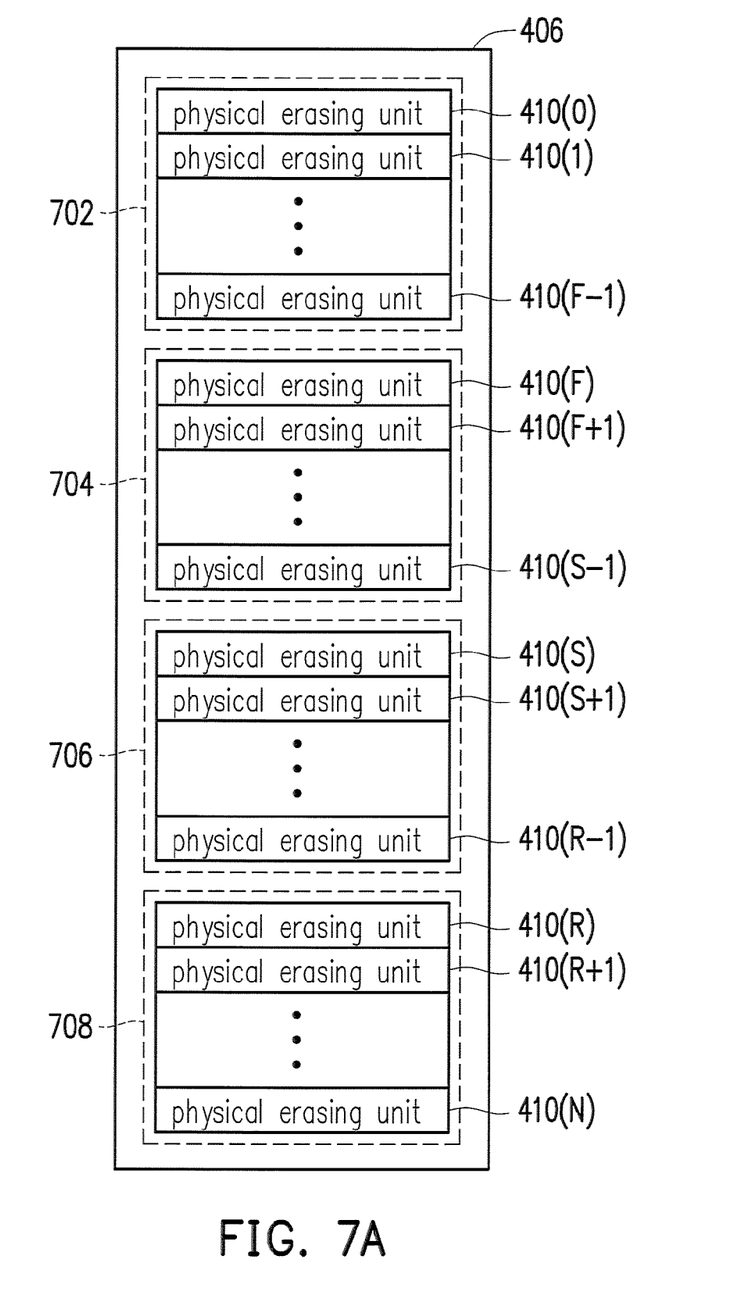
FIG. 7A and FIG. 7B are schematic diagrams illustrating a management of the physical erasing units according to an exemplary embodiment of the invention.
Figure 7B:
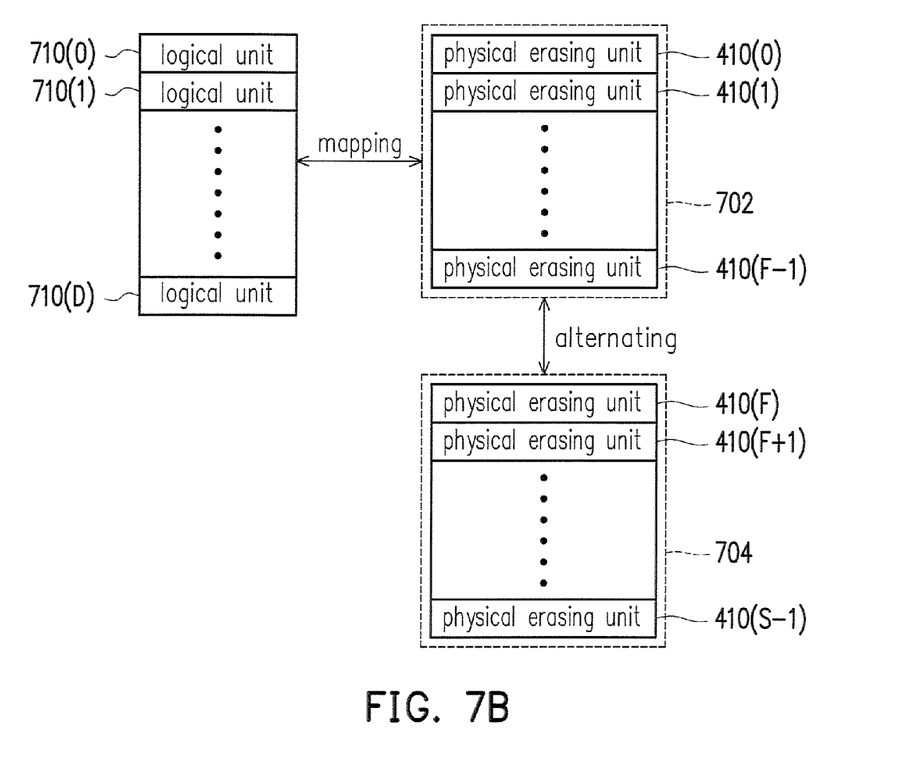

FIG. 7A and FIG. 7B are schematic diagrams illustrating a management of the physical erasing units according to an exemplary embodiment of the invention.

It should be understood that terms, such as "get", "group", "divide", "associate" and so forth, are logical concepts which describe operations of the physical erasing units of the rewritable non-volatile memory module 406. That is, the physical erasing units of the rewritable non-volatile memory module are logically operated, but actual positions of the physical erasing units of the rewritable non-volatile memory module are not changed.

Referring to FIG. 7A, the memory control circuit unit 404 (or the memory management circuit 502) may logically group the physical erasing units 410(0) to 410(N) into a data area 702, a spare area 704, a system area 706 and a replacement area 708.

The physical erasing units logically belonging to the data area 702 and the spare area 704 are configured to store data from the host system 11. More specifically, the physical erasing units of the data area 702 are regarded as the physical erasing units stored with the data, whereas the physical erasing units of the spare area 704 are configured to replace the physical erasing units of the data area 702. In other words, when the write command and the data to be written are received from the host system 11, the memory management unit 502 gets the physical erasing units from the spare area 704, and writes the data into the selected physical erasing units in order to replace the physical erasing units in the data area 702.

The physical erasing units logically belonging to the system area 706 are configured to record system data. For instance, the system data includes information related to manufacturer and model of the rewritable non-volatile memory module, a number of physical erasing units in the rewritable non-volatile memory module, a number of the physical programming units in each physical erasing unit, and so forth.

The physical erasing units logically belonging to the replacement area 708 are used in a bad physical erasing unit replacement procedure for replacing damaged physical erasing units. More specifically, if there are still available physical erasing units in the replacement area 708 when the physical erasing units of the data area 702 are damaged, the memory management circuit 502 gets the available physical erasing units from the replacement area 708 for replacing the damaged physical erasing units.

Particularly, the numbers of the physical erasing units in the data area 702, the spare area 704, the system area 706 and the replacement area 708 may be different from one another according to the different memory specifications. In addition, it should be understood that, during operations of the memory storage device 10, grouping relations of the physical erasing units for associating with the data area 702, the spare area 704, the system area 706, and the replacement area 708 may be dynamically changed. For instance, if the damaged physical erasing units in the spare area 704 are replaced by the physical erasing units in the replacement area 708, the physical erasing units originally from the replacement area 708 are then associated with the spare area 704.

Referring to FIG. 7B, as described above, the physical erasing units in the data area 702 and the spare area 704 are stored with data written by the host system 11 in an alternating manner. In the present exemplary embodiment, the memory control circuit unit 404 (or the memory management circuit 502) configures logical units 710(0) to 710(D) to the host system 11 in order to map the physical erasing units 414(0) to 410(F−1) of the data area 702, so as to facilitate accessing data in the physical erasing units which store data in the aforementioned alternating manner. In particular, the host system 11 accesses data in the data area 702 through the logical units 710(0) to 710(D). Moreover, the memory control circuit unit 404 (or the memory management circuit 502) establishes a logical-physical mapping table in order to record the mapping relationship between the logical units and the physical erasing units. The logical-physical mapping table may also be, for instance, for recording various logical-physical relationships such as mapping relationship between logical units and physical programming units, between logical programming units and physical programming units and/or between logical programming units and physical erasing units. The present invention does not set a limit thereto.

More particularly, in general access to the buffer memory 508, if a write command is executed by the host system 11, the memory control circuit unit 404 (or the memory management circuit 502) temporarily stores write data corresponding to the write command to unused buffer units of the buffer units 610(0) to 610(511) of the buffer memory 508. When the write data is temporarily stored to the buffer memory 508 successfully, the memory control circuit unit 404 (or the memory management circuit 502) sends a confirmation message to the host system 11 to inform the host system 11 completion of the write operation, and record the buffer units stored with the data and the corresponding logical units according to the logical units 710(0) to 710(D) disposed to the host system 11, so as to update the logic unit-buffer unit mapping table. This way, while the memory control circuit unit 404 (or the memory management circuit 502) executes the read operation, the logical location of the data to be read in the logical unit-buffer unit mapping table is searched, so as to obtain the buffer units stored with all the data to be read, and read the data from the buffer units.

In general, the memory control circuit unit 404 (or the memory management circuit 502) writes data in all the buffer units 610(0) to 610(511) into the rewritable nonvolatile memory module 406, and clears the write buffer units 610(0) to 610(511) to receive write data from the host system 11 and execute background task when all the buffer units 610(0) to 610(511) in the buffer memory 508 are being used and all the background tasks in the rewritable nonvolatile memory module 406 are completed. However, as the amount of buffer units of the buffer memory 508 being used increases, the size of the mapping table of the logical unit-buffer unit also becomes greater. In other words, when executing read commands, more time is needed for the memory control circuit unit 404 (or the memory management circuit 502) to search the logical unit-buffer unit mapping table. Accordingly, the reading speed of the memory control circuit unit 404 (or the memory management circuit 502) slows down and causes the reading time of the host system 11 to be too long.

To prevent performance of the memory storage device from being affected by the decrease in read speed in the memory control circuit unit 404 (or the memory management circuit 502), in the present exemplary embodiment, the memory control circuit unit 404 (or the memory management circuit 502) receives sequentially at least one operation command from the host system 11, and if the at least one operation command includes at least one read command, the memory control circuit unit 404 (or the memory management circuit 502) determines whether the at least one read command is a sequence of consecutive read commands. If the read commands are a consecutive read commands, the memory control circuit unit 404 (or the memory management circuit 502) determines whether a valid data count of the buffer memory 508 is a predetermined value. if the memory control circuit unit 404 (or the memory management circuit 502) determines the valid data count is the predetermined value, the memory control circuit unit 404 (or the memory management circuit 502) directly reads data corresponding to the read command currently received from the rewritable nonvolatile memory module 406. This way, the operation of searching the logical unit-buffer unit mapping table can be omitted. It should be noted that the aforementioned "receives sequentially at least one operation command" and "the read commands are consecutive read commands" do not impose a limitation that the memory control circuit unit 404 (or the memory management circuit 502) cannot execute other tasks during the period of receiving a sequence of consecutive read commands. For instance, while sequentially receive the sequence of consecutive read commands, the memory control circuit unit 404 (or the memory management circuit 502) executes a background task, e.g., saving a mapping table, garbage collection, and/or error correction.

Here, the valid data count is used to record the number of buffer units stored with valid data. For instance, each time the memory control circuit unit 404 (or the memory management circuit 502) receives a read command, the memory control circuit unit 404 (or the memory management circuit 502) temporarily stores write data corresponding to the write command to at least one unused buffer unit of the buffer units, and accumulate the number of the at least one buffer to the current valid data count. However, the invention does not set a limit thereto. For instance, in another exemplary embodiment, the valid data count is used to record the number of valid data in the buffer units corresponding to each write command. Moreover, in the present exemplary embodiment, the aforementioned predetermined value is zero. In other words, if the valid data count is the predetermined value, no buffer unit in the buffer memory 508 is stored with valid data. In other words, the logical unit-buffer unit mapping table used to record logical units corresponding to each of the buffer unit does not record the mapping relation between the logical units and the buffer units. Accordingly, the memory control circuit unit 404 (or the memory management circuit 502) does not need to search the logical unit-buffer unit mapping table, and can read data directly in the data area 702 of the rewritable nonvolatile memory module 406 according to the logical-physical mapping table.

Relatively speaking, if the valid data count is not the predetermined value (i.e. the valid data count is not zero), some of the buffer units of the buffer memory 508 are stored with valid data. Accordingly, the memory control circuit unit 404 (or the memory management circuit 502) searches the logical unit-buffer unit mapping table to read data in the buffer units corresponding to the read commands currently received. Particularly, in the present exemplary embodiment, if the memory control circuit unit 404 (or the memory management circuit 502) determines the valid data count is not the predetermined value, the memory control circuit unit 404 (or the memory management circuit 502) counts an amount of accumulative data of consecutive read commands. For instance, the memory control circuit unit 404 (or the memory management circuit 502) accumulates an amount of data corresponding to the received read commands to the current amount of accumulative data to obtain the total amount of data of the consecutive read commands received.

Next, the memory control circuit unit 404 (or the memory management circuit 502) further determines whether the amount of accumulative data has reached a data threshold. For instance, the memory control circuit unit 404 (or the memory management circuit 502) determines whether the amount of accumulative data is greater or is equal to the data threshold, and if the amount of accumulative data is greater or equal to the data threshold, write the data of the buffer units stored with valid data into the rewritable non-volatile memory module 406. In particular, after writing the data of the buffer units stored with valid data into the rewritable non-volatile memory module 406, the memory control circuit unit 404 (or the memory management circuit 502) clears all write buffer units. That is, at this time the buffer memory 508 does not include any buffer unit stored with valid data. Accordingly, the memory control circuit unit 404 (or the memory management circuit 502) resets the valid data count to zero. In other words, in the present exemplary embodiment, the memory control circuit unit 404 (or the memory management circuit 502) does not wait until all the buffer units 610(0)~610(511) of the buffer memory 508 are used to write all the data of the buffer units 610(0)~610(511) into the rewritable non-volatile memory module 406. This way the logical unit-buffer unit mapping table does not become too big for being stored with too much data and cause the memory control circuit unit 404 (or the memory management circuit 502) to waste time searching the logical unit-buffer unit mapping table.

Thereafter, because the valid data count is already reset to zero by the memory control circuit unit 404 (or the memory management circuit 502), when the memory control circuit unit 404 (or the memory management circuit 502) receives new read command from the host system 11 again, the memory control circuit unit 404 (or the memory management circuit 502) determines the valid data count corresponding to data stored in the buffer units of the memory 508 is the predetermined value and skips searching the logical unit-buffer unit mapping table, and directly reads data corresponding to the read command currently received in the rewritable nonvolatile memory module 406. This way, the efficiency of the memory control circuit unit 404 (or the memory management circuit 502) in executing read operation can be increased.

Here, a data threshold is used by the memory control circuit unit 404 (or the memory management circuit 502) to determine the size of the amount of accumulative data of the sequence of consecutive read commands received. For instance, in the present exemplary embodiment, the data threshold is 32 MB, and the size of each buffer unit is 4 KB. Accordingly, in the instance that the host system 11 uses 4 KB as the unit for accessing or transmitting data, after the host system 11 transmits 8192 read commands, the amount of accumulative data of consecutive read commands received by the memory control circuit unit 404 (or the memory management circuit 502) is greater than the data threshold (i.e. 32 MB). However, the invention does not set a limit on the access or transmit unit used by the host system 11. For instance, in the instance that the amount read data corresponding to a read command issued by the host system 11 is greater than or equal to 32 MB, after the host system 11 issues one read command or two consecutive read commands, the amount of accumulative data of the consecutive read commands received by the memory control circuit unit 404 (or the memory management circuit 502) is greater than the data threshold (i.e. 32 MB). Particularly, in the present exemplary embodiment, because the amount of accumulative data must be the amount of data of the sequence of consecutive read commands received, in the instance that the accumulated amount of data does not reach the data threshold, if the memory control circuit unit 404 (or the memory management circuit 502) receives a write command, the memory control circuit unit 404 (or the memory management circuit 502) resets the amount of accumulative data to zero and re-counting the size of the amount of accumulative data of consecutive read commands. Accordingly, via the mechanism of the memory control circuit unit 404 (or the memory management circuit 502) clearing buffer units upon the amount of accumulative data of consecutive read commands received reaching a data threshold, the problem of decreased read speed of the memory control circuit unit 404 (or the memory management circuit 502) as a result of enlarged logical unit-buffer unit mapping table caused by a large amount of buffer units in the buffer memory 508 being used to temporarily store data where operation commands from the host system 11 are mixed with read and write commands can be avoided. It must be understood that the invention does not set a limit on the value of the data threshold value. For instance, the data threshold may be greater or less than 32 MB.

In another exemplary embodiment of the present invention, in the above described sequentially received consecutive commands, one to two write commands are allowed, and in the consecutive operation commands, all operation commands other than the one or two write commands are read commands. As a result, the memory control circuit unit 404 (or the memory management circuit 502) does not reset the amount of accumulative data to zero upon receiving a first write command. Similarly, the memory control circuit unit 404 (or the memory management circuit 502) determines whether a valid data count corresponding to data stored in the buffer units of the memory 508 is the predetermined value. Note that in this example the predetermined value is, for instance, 2. Accordingly, if the consecutive operation commands include two write commands, the memory control circuit unit 404 (or the memory management circuit 502) can also directly read data corresponding to the commands received in the rewritable nonvolatile memory module 406 if the valid data count is the predetermined value. Conversely, if the valid data count is not the predetermined value, count the amount of accumulative data in the consecutive operation commands other than the two write commands, so as to write data in the buffer units into the rewritable nonvolatile memory module 406 if the amount of accumulative data in the read command is greater than the data threshold. In other words, in this instance, the memory control circuit unit 404 (or the memory management circuit 502) resets the amount of accumulative data to zero only when it receives more than two write commands. It must be understood that the invention sets no limit on the number of write commands allowed in the consecutive operation commands. For instance, in another exemplary embodiment, the number of write commands in the consecutive operation commands may be greater than two and the predetermined value is greater than 2.

Figure 8A:
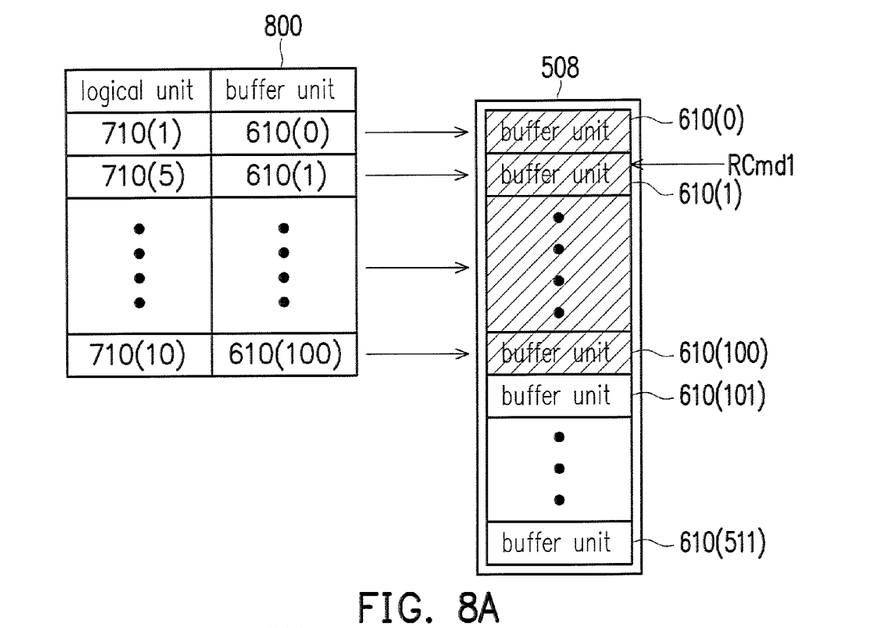
FIG. 8A to FIG. 8C are schematic diagrams illustrating a memory control circuit unit (or memory management circuit) executing a data access method according to an exemplary embodiment.
Figure 8B:
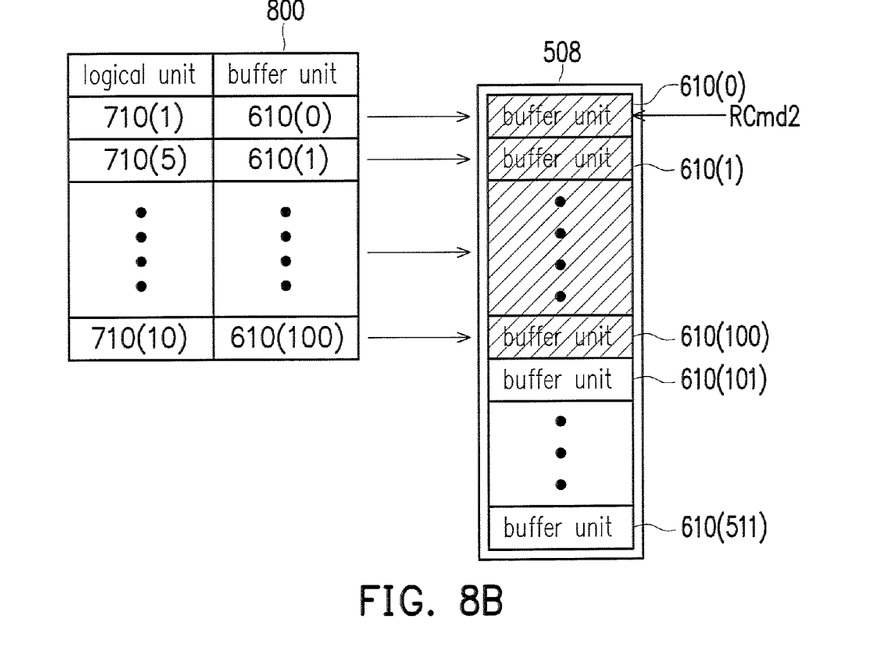
Figure 8C:
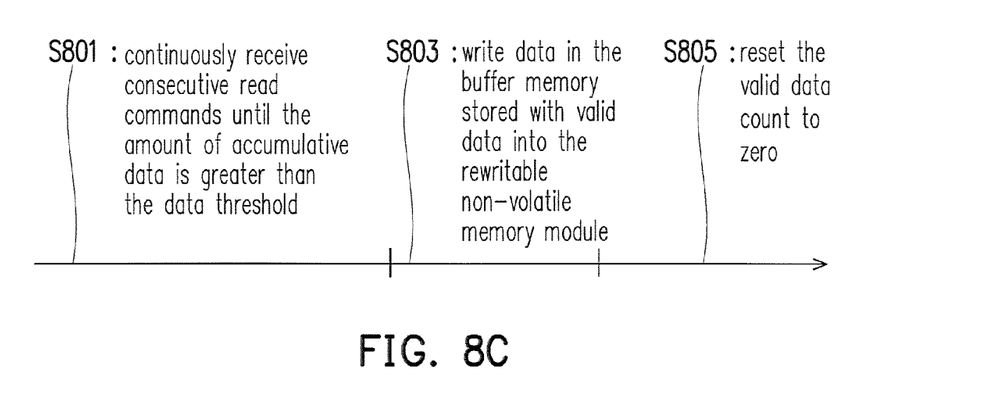

FIGS. 8A to 8C below more clearly illustrate operation of the execution of data access method of the memory control circuit unit 404 (or the memory management circuit 502) of the invention. FIGS. 8A to 8C are schematic diagrams illustrating execution of a data access method by a memory control circuit unit (or memory management circuit) according to an exemplary embodiment.

Refer to FIGS. 8A to 8C. In the case the number of buffer units in the buffer memory 508 currently used is 101 (e.g. buffer units 610(0) to 610(100) are used), the size of a logical unit-buffer unit mapping table 800 is the same as 101 buffer units stored with valid data, so as to record logical units corresponding to the buffer units 610(0) to 610(100). For instance, the buffer unit 610(0) corresponds to the logical unit 710(1), and the buffer unit 610(1) corresponds to the logical unit 710(5). As shown in FIG. 8A, when the memory control circuit unit 404 (or the memory management circuit 502) receives a read command RCmd1, the memory control circuit unit 404 (or the memory management circuit 502) identifies that the read command RCmd1 indicates to read data stored in the logical unit 710(5). Accordingly, the memory control circuit unit 404 (or the memory management circuit 502) searches the buffer unit 610(1) corresponding to the logical unit 710(5) according to the logical unit-buffer unit mapping table 800 and reads the data in the buffer unit 610(1).

Since now the buffer units 610(0) to 610(100) of the buffer memory 508 are stored with valid data, in this instance, the current valid data count is, for instance, 101. And as described above, in an instance where the predetermined value is zero, after receiving the read command RCmd1 from the host system 11, the memory control circuit unit 404 (or the memory management circuit 502) determines whether a valid data count is zero. Here, since the valid data count "101" is not zero, the memory control circuit unit 404 (or the memory management circuit 502) accumulates the amount of cumulative data corresponding to the read commands RCmd1 received (e.g. 4 KB) to the current amount of accumulative data (e.g. 0 KB) in order to obtain the amount of accumulative data "4 KB." Next, the memory control circuit unit 404 (or the memory management circuit 502) determines whether the amount of accumulative data is greater than the data threshold. In the present exemplary embodiment, the data threshold is "32 MB." Accordingly, the memory control circuit unit 404 (or the memory management circuit 502) does not write the data in the buffer units stored with valid data into the rewritable nonvolatile memory module 406.

In other words, as shown in FIG. 8C, in step S801 where the memory control circuit unit 404 (or the memory management circuit 502) executes the data access method, the memory control circuit unit 404 (or the memory management circuit 502) continuous to receive the consecutive read commands until the amount of accumulative data is greater than the data threshold. If the amount of accumulative data is greater than the data threshold, enter step S803 to write the data in the buffer unit stored with valid data into the rewritable non-volatile memory module 406. For instance, in the case that the memory control circuit unit 404 (or the memory management circuit 502) sequentially receives the read command RCmd1 and the consecutive read commands, and the amount of accumulative data is already updated to "31998 KB," as shown in FIG. 8B, if the memory control circuit unit 404 (or the memory management circuit 502) subsequently receives a read command RCmd2 from the host system 11, then the memory control circuit unit 404 (or the memory management circuit 502) reads data corresponding to the logical unit 710(1) in the buffer unit 610(0) according to the logical unit-buffer unit mapping table 800, and accumulate the amount of data corresponding to the currently received read command RCmd2 to the current amount of accumulated data "31998 KB" to obtain an accumulative amount of "32002 KB." At this time, the memory control circuit unit 404 (or the memory management circuit 502) determines the amount of accumulative data (i.e. 32002 KB) already exceeds the data threshold (i.e. 32 MB). Accordingly, in step S803, the memory control circuit unit 404 (or the memory management circuit 502) writes the valid data in the buffer units 610(0) to 610(100) into the rewritable non-volatile memory module 406. Note that in step S803, if while the valid data of the buffer units 610(0) to 610(100) is not yet completely written into the rewritable non-volatile memory module 406, the memory control circuit unit 404 (or the memory management circuit 502) still receives the read commands from the host system 11, the memory control circuit unit 404 (or the memory management circuit 502) still searches for buffer units stored with data corresponding to the read commands in the logical unit-buffer unit mapping table.

Next, after the memory control circuit unit 404 (or the memory management circuit 502) completely writes the valid data of the buffer units 610(0) to 610(100) into the rewritable non-volatile memory module 406, the memory control circuit unit 404 (or the memory management circuit 502) enters step S805 to reset the valid data count to zero. More particularly, in step S805, if the memory control circuit unit 404 (or the memory management circuit 502) still receives read commands from the host system 11, since valid data of the buffer units 610(0) to 610(100) is completely written into the rewritable non-volatile memory module 406, the memory control circuit unit 404 (or the memory management circuit 502) skips searching the logical unit-buffer unit mapping table and directly reads the physical erasing units corresponding to the read command in the rewritable nonvolatile memory module 406. Note that, via the above described data access method executed by the memory control circuit unit 404 (or the memory management circuit 502), through skipping searching of the logical unit-buffer unit mapping table, the system bus bandwidth is increased from 130 KB/sec to 280 KB/sec.

Figure 9:
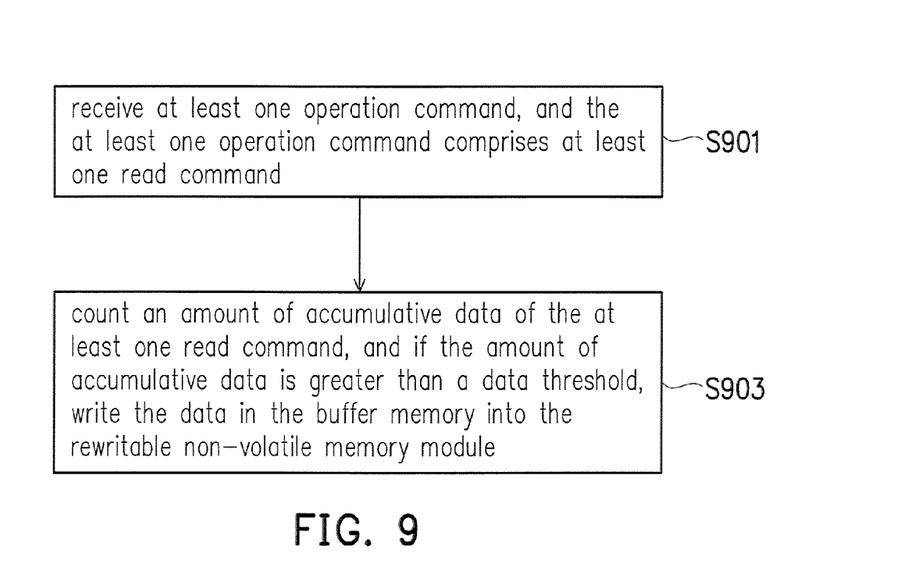
FIG. 9 and FIG. 10 are flowcharts illustrating the data access method according to an exemplary embodiment.
Figure 10:
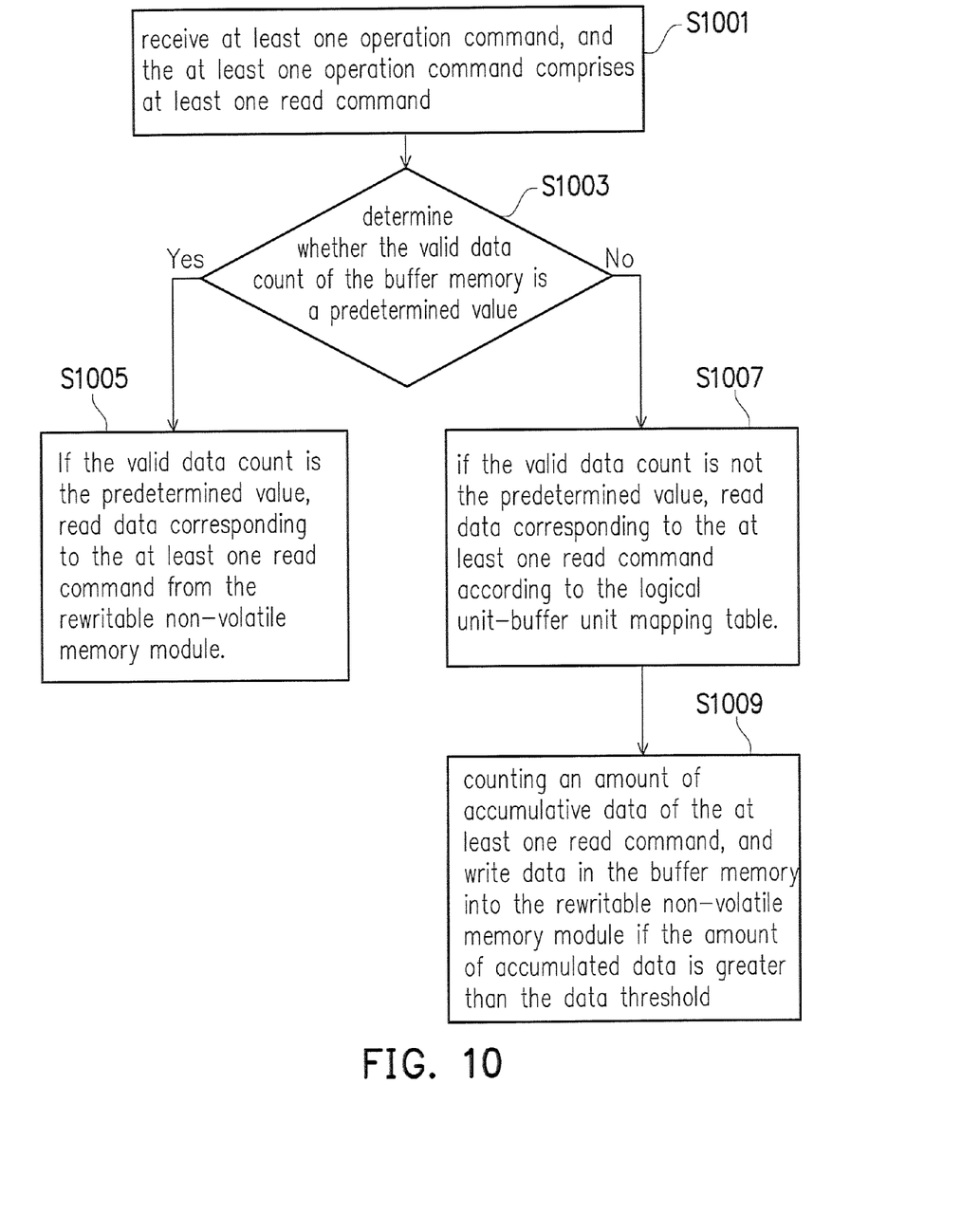

FIG. 9 and FIG. 10 are flowcharts illustrating the data access method according to an exemplary embodiment.

Refer to FIG. 9. In step S901, the memory control circuit unit 404 (or the memory management circuit 502) receives at least one operation command, and the at least one operation command comprises at least one read command.

Next, in step S903, the memory control circuit unit 404 (or the memory management circuit 502) counts an amount of accumulative data of the at least one read command, and if the amount of accumulative data is greater than a data threshold, writes the data in the buffer memory into the rewritable non-volatile memory module 406.

More particularly, the data access method of the invention further includes determining whether to directly read data corresponding to the read commands in the rewritable non-volatile memory module 406 according to the valid data count. Refer to FIG. 10, step S1001 is similar to S901, and step S1009 is similar to step S903, so they are not be repeated here. For instance, after the memory control circuit unit 404 (or the memory management circuit 502) receives the at least one command, the memory control circuit unit 404 (or the memory management circuit 502) determines whether a valid data count of the buffer memory 508 is a predetermined value in step S1003.

If the valid data count is the predetermined value, in step S1005, the memory control circuit unit 404 (or the memory management circuit 502) reads data corresponding to the at least one read command from the rewritable non-volatile memory module 406. Conversely, if the valid data count is not the predetermined value, in step S1007, the memory control circuit unit 404 (or the memory management circuit 502) reads data corresponding to the at least one read command from the buffer units according to the logical unit-buffer unit mapping table. And, in step S1009, the memory control circuit unit 404 (or the memory management circuit 502) executes an operation identical to the operation in step S903, so as to write data in the buffer memory into the rewritable non-volatile memory module 406 if the amount of accumulated data is greater than the data threshold.

The steps in FIG. 9 and FIG. 10 are as explained above and are not repeated here. Note that the steps in FIG. 9 and FIG. 10 may be multiple program codes or circuits. The invention does not set a limit thereto. Moreover, the methods in FIG. 9 and FIG. 10 may be implemented together with the above described embodiments or implemented alone. The invention does not set a limit thereto.

According to the above, the invention provides a mechanism for clearing data in the buffer memory and writing data into a rewritable non-volatile memory module via counting the amount of accumulative data of consecutively received read commands. The mechanism allows for skipping searching the logical unit-buffer unit mapping table if the valid data count in the buffer memory is a predetermined value, and directly read data from the rewritable non-volatile memory module, and accordingly increase the data access efficiency of the memory control circuit unit (or the memory management circuit). On the other hand, if the valid data count in the buffer memory is not the predetermined value, the above described mechanism can prevent the problem of decreased access speed of the memory control circuit unit (or the memory management circuit) as a result of enlarged logical unit-buffer unit mapping table caused by a large amount of buffer units in the buffer memory where operation commands from the host system are mixed read and write commands. This way, the overall function of the memory storage device is improved and the access time and operation time for the host system are decreased, effectively solving the problem of long wait time when the host system accesses or operates while the buffer memory is stored with a large amount of data.

The previously described exemplary embodiments of the disclosure have the advantages aforementioned, wherein the advantages aforementioned not required in all versions of the disclosure.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A data access method for a memory storage device, wherein the memory storage device comprises a rewritable non-volatile memory module and a buffer memory, wherein the memory storage device is configured to be externally coupled with a host system through a host interface, and the data access method comprising:
   receiving at least one operation command from the host system, wherein the at least one operation command comprises at least one read command, wherein the at least one read command instructs to read data from the rewritable non-volatile memory module;
   counting an amount of accumulative data of the at least one read command;
   starting to write first data in the buffer memory into the rewritable non-volatile memory module according to the amount of accumulative data of the at least one read command, wherein the first data is write data which is received from the host system according to a write command and temporarily stored in the buffer memory;
   writing the first data in the buffer memory into the rewritable non-volatile memory module when the amount of the accumulative data is larger than a data threshold.

2. The data access method of claim 1, wherein the at least one operation command comprises at least one write command, and any operation command other than the at least one write command of the operation commands is the at least one read command.

3. The data access method of claim 1, wherein the buffer memory comprises a plurality of buffer units, the data access method further comprising:
   determining whether a valid data count of the buffer memory is a predetermined value;
   reading data corresponding to the at least one read command from the rewritable nonvolatile memory module without searching the buffer if the valid data count is the predetermined value; and
   reading data corresponding to the at least one read command from the buffer units according to a logical unit-buffer unit mapping table if the valid data count is not the predetermined value,
   wherein the step of counting the accumulative data of the at least one read command is executed after determining the valid data count is not the predetermined value.

4. The data access method of claim 3, wherein the predetermined value is zero.

5. The data access method of claim 3, further comprising:
   if a write command is received, resetting the amount of the accumulative data to zero and temporarily storing write data corresponding to the write command to at least one unused buffer unit of the buffer units, and counting the valid data count.

6. The data access method of claim 5, further comprising:
   resetting the valid data count to zero after the data stored in the buffer units is written into the rewritable non-volatile memory module.

7. A memory control circuit unit, configured to control a memory storage device having a rewritable non-volatile memory module and the memory control circuit unit, the memory control circuit unit comprising:
   a host interface configured to couple to a host system, wherein the memory storage device is configured to be externally coupled with the host system through the host interface;
   a memory interface configured to couple to the rewritable non-volatile memory module;
   a buffer memory coupled to the host interface and the memory interface; and
   a memory management circuit coupled to the host interface, the memory interface and the buffer memory, and configured to receive at least one operation command from the host system, wherein the at least one operation command comprises at least one read command, and the at least one read command instructs to read data from the rewritable non-volatile memory module,
   the memory management circuit is configured to count an amount of accumulative data of the at least one read command,
   wherein the memory management circuit is further configured to start to write first data in the buffer memory into the rewritable non-volatile memory module according to the amount of accumulative data of the at least one read command, wherein the first data is write data which is received from the host system according to a write command and temporarily stored in the buffer memory, wherein the memory management circuit is further configured to write the first data in the buffer memory into the rewritable non-volatile memory module when the amount of the accumulative data is larger than a data threshold.

8. The memory control circuit unit of claim 7, wherein the at least one operation command comprises at least one write command, and any operation command other than the at least one write command of the operation commands is the at least one read command.

9. The memory control circuit unit of claim 7, wherein the buffer memory comprises a plurality of buffer units, and the memory management circuit is configured to determine whether a valid data count of the buffer memory is a predetermined value, wherein if the valid data count is the predetermined value, the memory management circuit is configured to read data corresponding to the at least one read command from the rewritable nonvolatile memory module without searching the buffer, wherein if the valid data count is not the predetermined value, the memory management circuit is configured to read data corresponding to the at least one read command from the buffer units according to a logical unit-buffer unit mapping table, wherein the memory management circuit executes an operation of counting the amount of accumulative data of the at least one read command after determining the valid data count is not the predetermined value.

10. The memory control circuit unit of claim 9, wherein the predetermined value is zero.

11. The memory control circuit unit of claim 9, wherein if a write command is received, the memory management circuit resets the amount of the accumulative data to the predetermined value, temporarily stores write data corresponding to the write command to at least one unused buffer unit of the buffer units, and counts the valid data count.

12. The memory control circuit unit of claim 11, wherein the memory management circuit is configured to reset the valid data count to the predetermined value after the data stored in the buffer unit is written into the rewritable nonvolatile memory module.

13. A memory storage device, comprising:
a connecting interface unit configured to couple to a host system, wherein the memory storage device is configured to be externally coupled with the host system through the connecting interface unit;
a rewritable non-volatile memory module; and
a memory control circuit unit coupled to the connecting interface unit and the rewritable nonvolatile memory module, wherein the memory control circuit unit comprises a buffer memory and is configured to receive at least one operation command from the host system, wherein the at least one operation command comprises at least one read command, and the at least one read command instructs to read data from the rewritable non-volatile memory module, the memory control circuit unit is configured to count an amount of accumulative data of the at least one read command, wherein the control circuit unit is further configured to start to write first data in the buffer memory into the rewritable non-volatile memory module according to the amount of accumulative data of the at least one read command, wherein the first data is write data which is received from the host system according to a write command and temporarily stored in the buffer memory, wherein the control circuit unit is further configured to write the first data in the buffer memory into the rewritable non-volatile memory module when the amount of the accumulative data larger than a data threshold.

14. The memory storage device of claim 13, wherein the at least one operation command comprises at least one write command, and any operation command other than the at least one write command is the at least one read command.

15. The memory storage device of claim 13, wherein the buffer memory comprises a plurality of buffer units and the memory control circuit unit is configured to determine whether a valid data count of the buffer memory is a predetermined value, wherein if the valid data count is the predetermined value, the memory control circuit unit is configured to read data from the rewritable nonvolatile memory module corresponding to the at least one read command without searching the buffer, wherein if the valid data count is not the predetermined value, the memory control circuit unit is configured to read data from the buffer units corresponding to the at least one read command according to a logical unit-buffer unit mapping table, wherein the memory control circuit unit executes an operation of counting the amount of accumulative data of the at least one read command after determining the valid data count is not the predetermined value.

16. The memory storage device of claim 15, wherein the predetermined value is zero.

17. The memory storage device of claim 15, wherein if a write command is received, the memory control circuit unit is configured to reset the amount of the accumulative data to the predetermined value, temporarily store write data corresponding to the write command to at least one unused buffer unit of the buffer units, and count the valid data count.

18. The memory storage device of claim 17, wherein the memory control circuit unit is configured to reset the valid data count to the predetermined value after the data stored in the buffer unit is written into the rewritable nonvolatile memory module.

* * * * *